United States Patent Office 3,048,592
Patented Aug. 7, 1962

3,048,592
6-ETHYL-10-CHLORO-DESERPIDINE AND INTERMEDIATES AND PROCESSES FOR THEIR PRODUCTION
Georges Muller, Nogent-sur-Marne, and André Allais and Léon Velluz, Paris, France, assignors, by mesne assignments, to Roussel-UCLAF, S.A., Paris, France, a corporation of France
No Drawing. Filed Apr. 20, 1960, Ser. No. 23,374
Claims priority, application France Apr. 20, 1959
7 Claims. (Cl. 260—287)

This invention relates to a new disubstituted derivative of deserpidine, and more particularly 6-ethyl-10-chlorodeserpidine of the Formula XII:

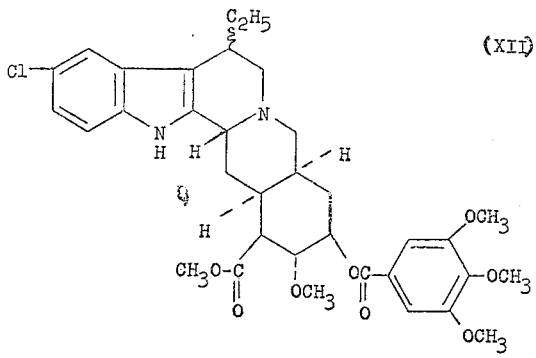

intermediates useful in preparing 6-ethyl-10-chloro-deserpidine, such as 2-(5′-chloro-3′-indolyl)-1-butylamine and processes for production of these compounds.

Reserpine and its analogs such as deserpidine and the synthetically produced analogs are of known physiological benefit as hypotensors, sedatives and transquillizers. The various known compounds possess some, if not all, of the physiological effects of reserpine itself.

The present invention produces a novel synthetic compound of the reserpine family, 6-ethyl-10-chloro-deserpidine, endowed with remarkable physiological properties in that it is effective as hypotensor and tranquilizer without any depressive action.

An object of the present invention is to obtain 6-ethyl-10-chloro-deserpidine having the structural formula:

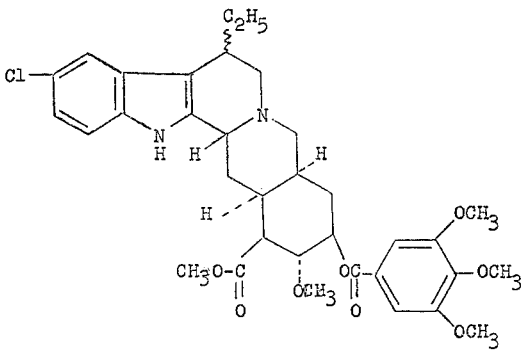

in the form of a mixture of the two 6 position stereo-isomers or in the form of one of the two 6-position stereoisomers, particularly in the form of the 6b-ethyl stereoisomer having a melting point of 263° C. to 265° C. and a specific rotation of $[\alpha]_D^{20} = -80.5°$ (c.=0.5% in chloroform).

Another object of this invention is to develop a process for the production of 6-ethyl-10-chloro-deserpidine.

A further object of this invention is to obtain intermediates useful in producing 6-ethyl-10-chlorodeserpidine such as:

(a) 2-(5′-chloro-3′-indolyl)-1-nitro-butane (II)
(b) 2-(5′-chloro-3′-indolyl)-1-butylamine (III)
(c) 18β-acetoxy-6-ethyl-10-chloro-17α-methoxy-16β-carbomethoxy-2-3,3-4-diseco-$\Delta^{4(21)}$-20α-yohimbene-3 - oic acid (V)
(d) 18β-acetoxy-6-ethyl-10-chloro-17α-methoxy-16β-carbomethoxy-2-3,3-4-diseco-20α-yohimbane - 3 - oic acid (VI)
(e) 18β-acetoxy-6-ethyl-10-chloro-17α-methoxy-16β-carbomethoxy-3-oxo-2,3-seco-20α-yohimbane and its two 6-position stereoisomers (VII)
(f) 18β-hydroxy-6-ethyl-10-chloro-17α-methoxy-16β-carbomethoxy-3-oxo-2,3-seco-20α-yohimbane and its two 6-position stereoisomers (VIIa)
(g) 18β-acetoxy-6-ethyl-10-chloro-17α-methoxy-16β-carbomethoxy-$\Delta^{3(14)}$-20α-yohimbene and its two 6-position stereoisomer forms (VIII)
(h) 18β-acetoxy-6-ethyl-10-chloro-17α-methoxy-16β-carbomethoxy-3β,20α-yohimbane and its two 6-position stereoisomer forms (X) and their 3α-isomers (IX)
(i) 18β-hydroxy-6-ethyl-10-chloro-17α-methoxy-16β-carbomethoxy-3β,20α-yohimbane and its two 6-position stereoisomer forms (XI)

These and further objects of this invention will become apparent as the description proceeds.

In accordance with the present invention, 6-ethyl-10-chloro-deserpidine is prepared starting from 2-(5′-chloro-3′-indolyl)-1-butylamine and from dextro-rotatory 1β-carboxymethyl-2β-carbomethoxy-3α-methoxy - 4β - acetoxy-6β-formyl-cyclohexane having a specific rotation $[\alpha]_D^{20} = +42.5°$ (c.=1% in pyridine).

2-(5′-chloro-3′-indolyl)-1-butylamine is prepared by transforming 2-(5′-chloro-3′-indolyl)-1-nitro-ethene, I, by a Grignard reaction with an ethyl magnesium halide into 2-(5′-chloro-3′-indolyl)-1-nitro-butane, II. The nitro group of compound II is then reduced into an amino group.

Dextro-rotatory 1β-carboxymethyl-2β - carbomethoxy-3α-methoxy-4β-acetoxy-6β-formyl-cyclohexane, IV, is obtained in accordance with the copending, commonly-assigned, United States patent application Serial No. 727,780, filed April 11, 1958, now Patent No. 2,971,978.

Condensation of the amine III with dextro-rotatory 1β-carboxymethyl-2β-carbomethoxy-3α-methoxy-4β-acetoxy-6β-formyl-cyclohexane, IV, produces 18β-acetoxy-6-ethyl-10-chloro-17α-methoxy-16β-carbomethoxy-2-3,3-4-diseco-$\Delta^{4(21)}$-20α-yohimbene-3-oic acid, V. The acid V is reduced to give 18β-acetoxy-6-ethyl-10-chloro-17α-methoxy-16β-carbomethoxy-2-3,3-4-diseco-20α-yohimbane - 3-oic acid, VI. This last compound VI is then cyclized into 18β-acetoxy-6-ethyl-10-chloro-17α-methoxy - 16β - carbomethoxy-3-oxo-2-3-seco-20α-yohimbane, VII. Compound VII can then optionally be saponified to the corresponding 18β-hydroxy-6-ethyl-10-chloro-17α-methoxy-16β-carbomethoxy-3-oxo-2-3-seco-20α-yohimbane, VIIa. The 6-ethyl stereoisomers of compound VIIa can be separated by taking advantage of differences in solubilities between the two stereoisomers and the stereoisomers can be reacetylated to give compound VII in the form of its two stereoisomers. The following reaction can be carried out with either the mixture of the 6-position stereoisomers or the 6-position stereoisomers of the lactam VII: By cyclization of the lactam VII, 18β-acetoxy-6-ethyl-10-chloro-17α-methoxy-16β-carbomethoxy - $\Delta^{3(14)}$-20α-yohimbene, VIII, is obtained. The selective reduction of compound VIII leads to 18β-acetoxy-6-ethyl-10-chloro-17α-methoxy-16β-carbomethoxy - 3β,20α - yohimbane, X, or its 3α-isomer, IX. The partial saponification of the reduced 3β-yohimbane compound X produces 18β-hydroxy-6-ethyl-10-chloro-17α-methoxy - 16β - carbomethoxy-3β,20α-yohimbane, XI, which is esterified with trimethoxybenzoic acid to give 6-ethyl-10-chloro-deserpidine, XII.

The following schematic drawing, Table I, shows the course of the reactions involved in producing 2-(5'-chloro-3'-indolyl)-1-butylamine (III) and reacting this compound with dextro-rotatory 1β-carboxymethyl-2β-carbomethoxy - 3α - methoxy - 4β - acetoxy - 6β - formyl-cyclohexane (IV) to produce the desired 6-ethyl-10-chloro-deserpidine (XII).

In the table the customary structural formula designations are used. The solid bond attached to unsaturated ring carbon atoms denotes a β-attachment, the dotted line bond denotes an α-attachment, and the wavy line denotes an unknown configuration. Ac denotes the acetyl radical.

TABLE I

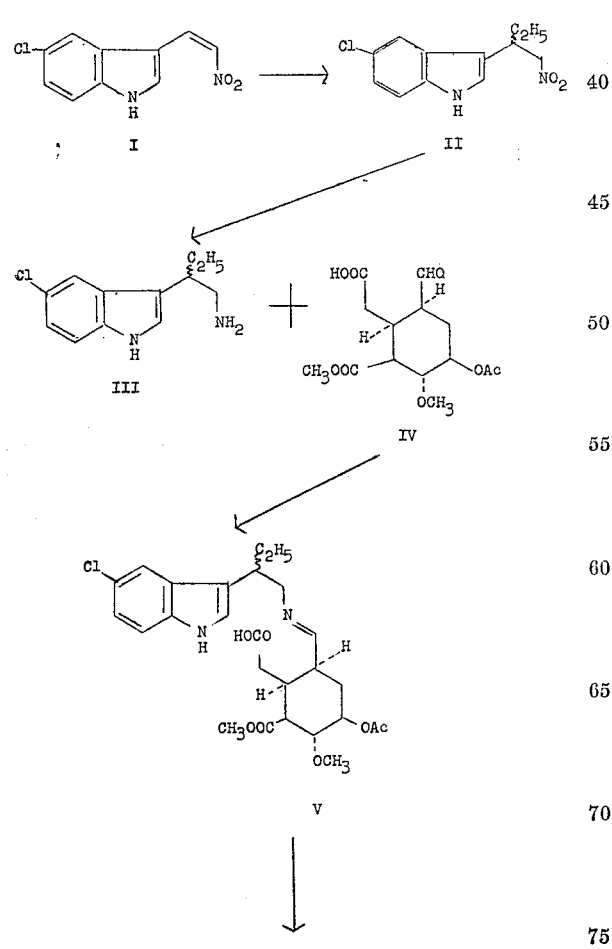

TABLE I—Continued

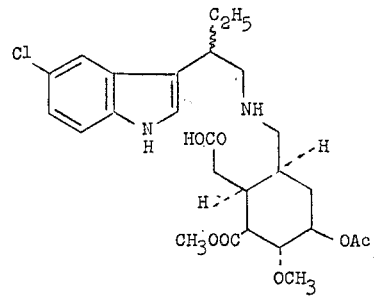

VI

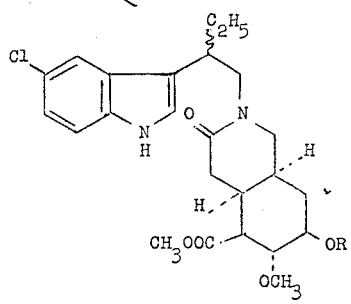

VII, R = Ac
VIIa, R = H

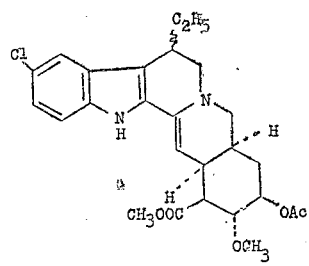

VIII

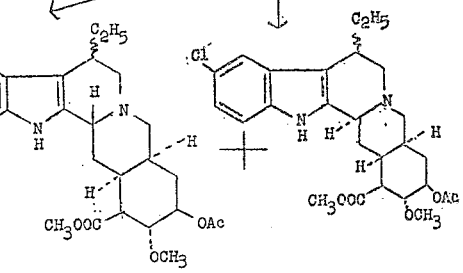

X          IX

TABLE I—Continued

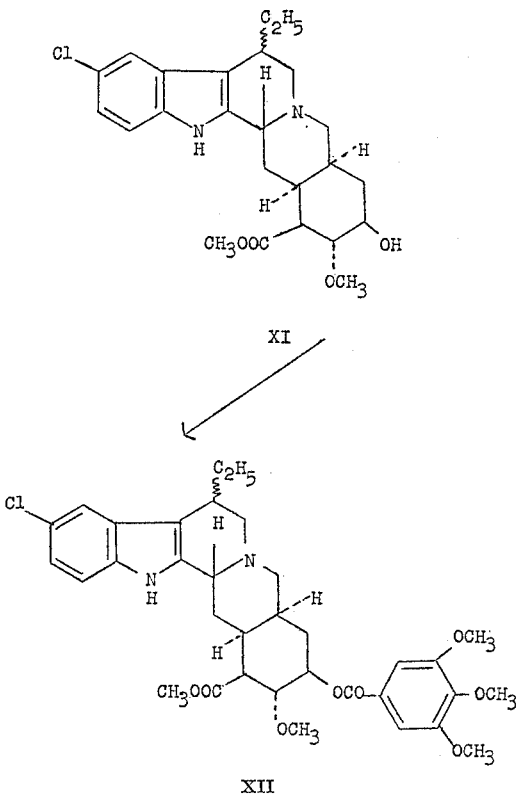

The process of the invention makes it possible to obtain 6-ethyl-10-chloro-deserpidine in the form of a mixture of two 6-stereoisomers, or to obtain separately each of these isomers. Since the configuration of the individual stereoisomers has not been determined, they will be referred to in the following as isomers a and b.

The separation of the stereoisomers is preferably effected in an early stage of the process, for example, from the lactam VII from which an easily crystallizable derivative, the 18β-hydroxy-6-ethyl-10-chloro-17α-methoxy-16β-carbomethoxy-3-oxo-2,3-seco-20α-yohimbane, VIIa, is obtained. It is possible to isolate each of the 6-ethyl stereoisomers of compound VIIa very easily, due to the difference in the solubilities between the two isomers.

A detailed description of the process of preparing 6b-ethyl-10-chloro-deserpidine having a melting point of 263° C. to 265° C. and a specific rotation of $[\alpha]_D^{20} = -80.5°$ (chloroform) follows. It is to be understood that the 6a-ethyl isomer or the mixture of the 6-position stereoisomers can be prepared similarly.

(a) 2-(5'-chloro-3'-indolyl)-1-nitro-ethene is transformed into 2-(5'-chloro-3'-indolyl)-1-nitro-butane by reaction of ethyl-magnesium-iodide in the presence of an anhydrous inert organic solvent, such as tetrahydrofuran, at low temperatures, (b) The nitro group of 2-(5'-chloro-3'-indolyl)-1-nitrobutane is reduced by lithium-aluminum hydride in solution in an anhydrous inert organic solvent such as tetrahydrofuran, at elevated temperatures, (c) The 2-(5'-chloro-3'-indolyl)-1-butylamine is condensed with dextro-rotatory (pyridine) 1β-carboxymethyl-2β-carbomethoxy-3α-methoxy-4β-acetoxy-6β-formylcyclohexane, dissolved in an aqueous solution of a water-miscible inert organic solvent in the presence of an organic tertiary base to cause production of 18β-acetoxy-6-ethyl-10-chloro-17α-methoxy-16β-carbomethoxy-2-3,3-4-diseco-Δ$^{4(21)}$-20α-yohimbene-3-oic acid, (d) This yohimbene-3-oic acid is then reduced with an alkali metal borohydride in the cold to give 18β-acetoxy-6-ethyl-10-chloro-17α-methoxy-16β-carbomethoxy-2-3,3-4-diseco-20α-yohimbane-3-oic acid, (e) The D-ring of the latter compound is cyclized by the action of heat to give 18β-acetoxy-6-ethyl-10-chloro-17α-methoxy-16β-carbomethoxy-3-oxo-2-3-seco-20α-yohimbane, (f) The 18β-hydroxy-6-ethyl-10-chloro-17α-methoxy-16β-carbomethoxy-3-oxo-2,3-seco-20α-yohimbane acid is obtained by saponification of 18β-acetoxy-6-ethyl-10-chloro-17α-methoxy-16β-carbomethoxy-3-oxo-2,3-seco-20α-yohimbane with the aid of an alkali metal borohydride, (g) The saponified compound is separated into its two stereo-isomer forms in the 6-position due to a difference in the solubility between them, and the b-isomer is reacetylated into the initial lactam, (h) The cyclization of 18β-acetoxy-6b-ethyl-10-chloro-17α-methoxy-16β-carbomethoxy-3-oxo-2,3-seco-20α-yohimbane is effected with the aid of phosphorus oxychloride and alkalizing is effected with ammonia, (i) 18β-acetoxy-6b-ethyl-10-chloro-17α-methoxy-16β-carbomethoxy-Δ$^{3(14)}$-20α-yohimbene is selectively reduced by zinc in perchloric acid solution, (j) The partial saponification of 18β-acetoxy-6b-ethyl-10-chloro-17α-methoxy-16β-carbomethoxy-3β,20α-yohimbane is effected by the action of an alkali metal borohydride, (k) The esterification of 18β-hydroxy-6b-ethyl-10-chloro-17α-methoxy-16β-carbomethoxy-3β,20α-yohimbane is effected with 3,4,5-trimethoxy-benzoyl chloride and the desired levo-rotatory (chloroform) 6b-ethyl-10-chloro-deserpidine is obtained.

The following examples illustrate the invention without limiting it. More particularly, the reaction temperatures may be varied, the nature of the solvents, the order of introduction of the reactants and the reaction periods may be varied, or the final trimethoxy-benzoylation may be effected with trimethoxy-benzoic acid anhydride in the presence of a pyridine base and trimethylamine, in accordance with the process described in United States Patent No. 2,926,167, issued February 23, 1960, without departing from the scope of the present invention. The examples will enable those skilled in the art to understand the invention more completely.

The melting points are instantaneous melting points determined on a Maquenne block. The temperatures are given in degrees centigrade.

EXAMPLE.—PREPARATION OF LEVO-ROTATORY 6b-ETHYL-10-CHLORO-DESERPIDINE, XII

Step 1.—2-(5'-Chloro-3'-Indolyl)-1-Nitro-Butane (II)

17.4 gm. of magnesium turnings are introduced into 200 cc. of anhydrous ether, 10 gm. of ethyl iodide are added, then after the reaction has started, a further 400 cc. of anhydrous ether and 114 gm. of ethyl iodide are added. The speed of introduction of the ether-ethyl iodide solution is regulated in such a way as to maintain a slight reflux. At the end of the reaction, the temperature is reduced to 20° C. 1.2 gm. of cuprous chloride are added and the mixture is agitated at room temperature for one hour. The mixture is then cooled to 0° C. and, in the space of an hour, 40 gm. of 2-(5'-chloro-3'-indolyl)-1-nitro-ethene, I, prepared according to E. H. P. Young, J. Am. Chem. Soc., 1958, page 3493, in 800 cc. of anhydrous tetrahydrofuran are introduced. A violet precipitate is formed which, toward the end of the introduction of compound I, changes to a deep red. The suspension obtained thereby is agitated for four hours at room temperature, then cooled to 0° C. and 700 cc. of a saturated solution of ammonium chloride are added thereto. The mixture is agitated, decanted and the aqueous phase is extracted with ether. The combined ether extracts are washed with water and dried. After drying, the extracts are distilled to dryness in vacuo and 43 gm. of 2-(5'-chloro-3'-indolyl)-1-nitro-butane (II) are obtained in the form of a reddish brown oil which is soluble in alcohol, ether, acetone, benzene and chloroform, and insoluble in water. Compound II is directly useable in the following stage of the synthesis.

*Step 2.—2-(5'-Chloro-3'-Indolyl)-1-Butylamine (III)*

43 gm. of raw compound II in solution in 500 cc. of anhydrous tetrahydrofuran are very slowly added to 22.5 gm. of lithium-aluminum hydride in 500 cc. of anhydrous tetrahydrofuran. The mixture is heated to reflux for five hours. After cooling, the excess lithium-aluminum hydride is destroyed by addition of 80 cc. of water, the alumina formed thereby is filtered off, and the filter cake is washed with 150 cc. of tetrahydrofuran. The tetrahydrofuran solutions are combined, distilled to dryness in vacuo, and the residue is taken up with 500 cc. of methylene chloride. The solution is extracted with 400 cc. of 10% acetic acid. The extracts are combined, washed with methylene chloride, and made alkaline to a pH of 9 by addition of caustic soda. The alkaline solution is extracted with 150 cc. of methylene chloride. The extracts are combined, washed with water, and dried with potassium hydroxide pellets. The extracts are filtered, distilled to dryness in vacuo and 24 gm. of 2-(5'-chloro-3'-indolyl)-1-butylamine (III) are obtained in the form of a translucent brown resin. The latter is dissolved in 180 cc. of ethyl acetate, 4.9 cc. of glacial acetic acid are added and the reaction mixture is allowed to stand for two hours at 0° C. The acetate of compound III precipitates and is separated by vacuum filtration. The filter cake is washed with ethyl acetate, dried and 19.7 gm. (that is 40% of the theoretical yield with respect to the quantity of compound II used) of the acetate of 2-(5'-chloro-3'-indolyl)-1-butylamine (III) are obtained, having a melting point of 135° to 138° C. Recrystallization from ethyl acetate does not change the melting point. The product is obtained in the form of prismatic white crystals, which decompose under heat, are soluble in water, alcohol and acetone, and insoluble in ether, benzene and chloroform.

*Analysis.*—$C_{14}H_{19}O_2N_2Cl$; molecular weight=282.7. Calculated: C, 59.46%; H, 6.77%; N, 9.9%; Cl, 12.54%. Found: C, 59.3%; H, 6.6%; N, 9.7%; Cl, 12.5%.

The picrate of compound III is also prepared by the customary process. This orange-colored salt, having a melting point of 222° C., is soluble in alcohol and acetone, insoluble in water, ether, benzene and chloroform.

Neither compound III nor its salts are described in the literature.

*Step 3.—18β-Acetoxy-6-Ethyl-10-Chloro-17α-Methoxy-16β-Carbomethoxy-2-3,3-4 Diseco - $\Delta^{4(21)}$ - 20α - Yohimbene-3-Oic Acid (V)*

7.2 gm. of dextro-rotatory (pyridine) 1β-carboxymethyl - 2β - carbomethoxy - 3α - methoxy - 4β - acetoxy - 6β-formyl-cyclohexane (IV) obtained according to the copending, commonly-assigned United States patent application, Serial No. 727,780, filed April 11, 1958, now Patent No. 2,971,978, are mixed with 14.4 cc. of water and 3.6 cc. of dimethylformamide. The mixture is cooled to between −5 and −10° C. and 7 cc. of triethylamine are added dropwise to the mixture. The solution is agitated for a quarter of an hour, cooled to −5° C., then a solution of 6.5 gm. of the acetate of 2-(5'-chloro-3'-indolyl)-1-butylamine (III) in 6.5 cc. of water and 6.5 cc. of dimethylformamide are introduced dropwise. The reaction mixture is agitated for about twenty minutes at −5° C. The resulting 18β-acetoxy-6-ethyl-10-chloro-17α - methoxy - 16β - carbomethoxy - 2 - 3,3 - 4 - diseco - $\Delta^{4(21)}$-20α-yohimbene-3-oic acid (V) is used without isolation for the following stage of the preparation.

*Step 4.—18β - Acetoxy-6-Ethyl-10-Chloro-17α-Methoxy-16β - Carbomethoxy - 2 - 3,3 - 4 - Diseco - 20α - Yohimbane-3-Oic Acid (VI)*

2.4 gm. of potassium borohydride are added in small portions to the Schiff's base II, which was not isolated from the medium of its preparation, while it is maintained at between −5° and −10° C. Heat is given off and the mixture foams. The mixture is allowed to stand for forty-five minutes at room temperature. The resulting 18β - acetoxy - 6 - ethyl - 10 - chloro - 17α - methoxy - 16β - carbomethoxy - 2 - 3,3 - 4 - diseco - 20α - yohimbane-3-oic acid (VI) was not isolated; it was used directly for the following stage of the synthesis.

*Step 5.—18β - Acetoxy-6-Ethyl-10-Chloro-17α-Methoxy-16β - Carbomethoxy - 3 - Oxo - 2 - 3 - Seco - 20α - Yohimbane (VII) Wherein R=Acetyl*

The solution of compound VI, obtained in the preceding stage, is cooled to −5° C. and 8 cc. of acetic acid, then 15 cc. of water are introduced over a period of 20 minutes under agitation. A gum forms. The mixture is heated to 80° C. for an hour and a half. The gum dissolves, then a white precipitate appears. The mixture is vacuum filtered. The filter cake is washed with water and taken up with methylene chloride. The mixture is successively washed with 5 N ammonia, with water, with 0.5 N hydrochloric acid, and again with water, then dried over magnesium sulfate. The solution is evaporated in vacuo and 10.5 gm. (that is 95% of theory) of 18β-acetoxy - 6 - ethyl - 10 - chloro - 17α - methoxy - 16β - carbomethoxy-3-oxo-2-3-seco - 20α - yohimbane (VII) is obtained having a specific rotation $[\alpha]_D^{20}=+14°\pm2$ (c.=0.5% in pyridine). Compound VII is obtained in the form of a white amorphous powder. It is not described in the literature.

SEPARATION OF THE 6-ETHYL STEREOISOMERS (*a*) *Saponification.*—10.5 gm. of compound VII are mixed with 200 cc. of methanol and 5.7 gm. of potassium borohydride. Gas is evolved; the solution is heated to the reflux temperature and the heating is continued for two hours. The mixture is then concentrated to 50 cc., cooled and 50 cc. of water are added. 18β-hydroxy-6-ethyl - 10 - chloro - 17α - methoxy - 16β - carbomethoxy - 3-oxo-2-3-seco-20α-yohimbane (VIIa) precipitates out. It is extracted with methylene chloride and the extracts are washed with water until neutral. After drying and concentrating in vacuo, 8 to 8.5 gm. (that is 80% of theory) of an amorphous powder of compound VIIa are obtained. It is redissolved in 3 volumes of ethyl acetate, the solution is agitated, then 4 to 6 cc. of water are added and the solution is iced for three to four hours. The precipitate formed thereby is vacuum filtered and the filter cake is washed with a little ethyl acetate saturated with water. 2.5 gm. (that is 45% of theory) of 6-ethyl isomer of the saponified compound VIIa, which hereinafter is referred to as isomer *a*, were recovered. The mother liquor is distilled to dryness and 5 to 6 gm. of a resin, consisting of the other 6-ethyl isomer which hereinafter is referred to as isomer *b*, are obtained.

Isomer 6a-ethyl is purified by recrystallization from 4 volumes of ethyl acetate and has a melting point of 185° C. and a specific rotation $[\alpha]_D^{20}=-20.5°$ (c.=0.5% in pyridine). This compound is obtained in an anhydrous state in the form of white needles and when it is hydrated, in the form of white prisms. It is soluble in alcohol, ether, acetone and chloroform, insoluble in water.

*Analysis.*—$C_{24}H_{31}O_5N_2Cl$; molecular weight=462.96. Calculated: C, 62.26%; H, 6.75%; N, 6.05%; Cl, 7.66%. Found: C, 65.2%; H, 6.7%; N, 5.7%; Cl, 7.8%.

(*b*) *Reacetylation of isomer a.*—6.15 gm. of saponified isomer *a*, having a melting point of 185° C. and a specific rotation $[\alpha]_D^{20}=-20.5°$ (pyridine), are mixed with 30 cc. of pyridine and 21 cc. of acetic acid anhydride, and heated to 50° C. for an hour under agitation. Then 100 gm. of a mixture of water and ice are added, and the reaction mixture is allowed to stand for two hours at room temperature. The precipitate, consisting of 18β-acetoxy-6a-ethyl-10-chloro-17α-methoxy-16β-carbomethoxy-3-oxo-2-3-seco-20α-yohimbane (VII), is vacuum filtered. The filter cake is washed with water and dried to obtain 7 gm. of the raw product. It is taken up with 10 volumes of methylene chloride, the solution is concentrated and 60 cc. of anhydrous ether are added. The mixture is agitated, iced and crystallization is initiated by scratching. It is vacuum filtered and after the filter cake is washed with ether, 6 gm. of the product, melting at 198° C. and having a specific rotation $[\alpha]_D^{20} = -23°$ (c.=0.5% in pyridine), are obtained.

For analysis, a sample is redissolved in methylene chloride, treated with animal charcoal and precipitated with ether without changing the constants of the product. It is obtained in the form of white prisms, insoluble in water and ether.

*Analysis.*—$C_{26}H_{33}O_6N_2Cl$; molecular weight=504.5. Calculated: C, 61.84%; H, 6.59%; N, 5.55%; Cl 7.02%. Found: C, 61.8%; H, 6.5%; N, 5.3%; Cl, 6.9%.

(c) *Reacetylation of isomer b.*—The 5 to 6 gm. of the resin obtained by distillation of the mother liquor under (a) above are dissolved in 5 volumes of pyridine and 3.5 volumes of acetic acid anhydride. The solution is heated for an hour to 60° C. under agitation, cooled, and 50 gm. of a mixture of water and ice are added thereto. The solution is then allowed to stand for three hours at room temperature. The solution is extracted with methylene chloride. The extracts are combined, washed with water, with 2 N hydrochloric acid and again with water until neutral. After drying and concentrating in vacuo, 4.5 to 5 gm. (that is 80% of theory) of an oily, orange-colored product consisting of 18β-acetoxy-6b-ethyl-10-chloro-17α-methoxy-16β-carbomethoxy-3-oxo-2,3-seco-20α-yohimbane (VII) are recovered.

*Step 6.—18β-Acetoxy-6b-Ethyl-10-Chloro-17α-Methoxy-16β-Carbomethoxy-Δ³⁽¹⁴⁾-20α-Yohimbene*
(VIII, 6b-*Isomer*)

4.8 gm. of 6b-isomer of compound VII in 50 cc. of phosphorus oxychloride are heated to reflux, and the heating is maintained for an hour and a half. After cooling, the excess of the reagent is eliminated by distillation in vacuo and the residue is taken up with 50 cc. of acetone. The solution is made alkaline by addition of an excess amount of ammonia at between −5 and −10° C. and then 50 cc. of water are added. The mineral precipitated thereby is dissolved and 18β-acetoxy-6b-ethyl-10-chloro-17α-methoxy-16β-carbo-methoxy-Δ³⁽¹⁴⁾-20α-yohimbene (VIII, 6b-isomer) remains in the precipitate. It is extracted with methylene chloride, washed with salt water, dried and distilled in vacuo to obtain 4.5 gm. of the raw product.

This compound is not described in the literature.

*Step 7.—18β-Acetoxy-6b-Ethyl-10-Chloro-17α-Methoxy-16β-Carbomethoxy-3α,20α-Yohimbane*
(IX, 6b-*Isomer*)

200 mgm. of raw compound VIII, 6b-isomer are dissolved in 5 cc. of methanol and 0.3 cc. of 2 N hydrochloric acid are added. The mixture is cooled to 0° C. and potassium borohydride is added over a period of 45 minutes until the pH is 8 to 9. By the addition of water, the 18β-acetoxy-6b-ethyl-10-chloro-17α-methoxy-16β-carbomethoxy-3α,20α-yohimbane (IX, 6b-isomer) precipitates. It is extracted with methylene chloride and the extract is washed with water. After drying over magnesium sulfate, the extract solution is distilled to dryness in vacuo to recover about 200 mgm. of a pale yellow resin. It is subjected to chromatography over 6 gm. alumina, eluted with methylene chloride, washed, dried and redistilled. 128 mgm. of the crystallized product are produced. By recrystallization from methanol, a white product in the form of needles is obtained, which turns yellow in the light, has a melting point of 290° to 295° C. and a specific rotation $[\alpha]_D^{20} = -29°$ (c.=0.5% in pyridine). It is soluble in ether and acetone, slightly soluble in alcohol and insoluble in water.

The infra-red spectrum confirms the theoretical structure and, particularly, the 3α-configuration.

This compound is not described in the literature.

*Step 8.—18β-Acetoxy-6b-Ethyl-10-Chloro-17α-Methoxy-16β-Carbomethoxy-3β,20α-Yohimbane*
(X, 6b-*Isomer*)

4.5 gm. of raw compound VIII, 6b-isomer are dissolved in 45 cc. of acetone and 45 cc. of 2 N perchloric acid. The solution is heated to 50° C., 0.5 cc. of a solution of ferric chloride is added thereto, then 9 gm. of powdered zinc is introduced. The solution is refluxed for 30 minutes. After cooling, the solution is decanted and poured into water. The residue is rinsed with acetone. The rinse water is combined with the aqueous solution and extracted with methylene chloride. The extracts are washed with salt water and dilute ammonia, then dried over magnesium sulfate and distilled to dryness in vacuo. 4.12 gm. (that is 90% of theory) of raw 18β-acetoxy-6b-ethyl-10-chloro-17α-methoxy-16β-carbomethoxy-3β,20α-yohimbane (X, 6b-isomer) are obtained. By recrystallization from methanol and methylene chloride, a colorless product consisting of rectangular or hexagonal prisms with a flat base are obtained with a melting point of 278° to 280° C. and a specific rotation $[\alpha]_D^{20} = -100°$ (c.=0.5% in pyridine). It is soluble in acetone and chloroform, and forms with methanol, a solvate resistant to heating up to 200° C. It is insoluble in water and ether.

*Analysis.*—$C_{26}H_{33}O_5N_2Cl$; molecular weight=489.0. Calculated: C, 63.85%; H, 6.80%; N, 5.73%; Cl, 7.25%. Found: C, 63.9%; H, 6.9%; N, 5.7%; Cl, 7.4%.

This compound is not described in the literature.

*Step 9.—18β-Hydroxy-6b-Ethyl-10-Chloro-17α-Methoxy-16β-Carbomethoxy-3β,20α-Yohimbane* (XI, 6b-*Isomer*)

A mixture of 300 mgm. of compound X, 6b-isomer, 9 cc. of methanol and 150 mgm. of potassium borohydride is heated to reflux under agitation for two hours. The resulting solution is concentrated to a small volume under reduced pressure, and precipitated by the addition of water. It is extracted with methylene chloride. The extracts are combined, washed with water, dried and concentrated to dryness in vacuo to recover 291 mgm. of raw 18β-hydroxy-6b-ethyl-10-chloro-17α-methoxy-16β-carbomethoxy-3β,20α-yohimbane (XI, 6b-isomer). It is taken up in 2 cc. of methanol; several drops of dilute nitric acid are added until the pH reaches 1; crystallization is initiated by scratching, and the mixture is iced and vacuum filtered. The nitrate, after washing is taken up in 3 cc. of acetone and made alkaline, while cooling, by the addition of several drops of 22° Bé ammonia. By extraction with methylene chloride and drying, a gummy product is obtained which is crystallized in a mixture of equal volumes of ethyl ether and isopropyl ether to give a yield of 140 mgm. (that is 50% of theory) of a product, obtained in the form of colorless prisms soluble in ether and acetone and insoluble in water, having a melting point of 215° C.

The infra-red spectrum confirms the given structure. The compound is not described in the literature.

*Step 10.—6b-Ethyl-10-Chloro-Deserpidine*
(XII, 6b-*Isomer*)

360 mgm. of 3,4,5-trimethoxy-benzoyl chloride are added to 120 mgm. of compound XI, 6b-isomer, in 1.5 cc. of pyridine, and the reaction mixture is heated to 70° C. in an atmosphere of nitrogen for 17 hours. The resulting reddish brown solution is added to water and heated to 40° to 45° C. for half an hour. The aqueous solution is extracted with methylene chloride, and the extracts are combined, washed successively with water, 2 N sulfuric acid, water, ammonia, and again with water and dried. The dried methylene chloride solution is treated with animal charcoal and distilled to dryness in vacuo. 166 mgm. of raw 6b-ethyl-10-chloro-deserpidine (XII, 6b-isomer) is obtained. It is taken up in 3 cc. of a mixture of equal parts of ethyl ether and isopropyl ether, the solution is iced and vacuum filtered. The filter cake is washed and there is obtained 107 mgm. (that is 62% of theory) of the product XII, 6b-isomer having a melting point of 263° to 265° C. and a specific rotation $[\alpha]_D^{20} = -80.5°$ (c.=0.5% in chloroform).

*Analysis.*—$C_{34}H_{41}O_8N_2Cl$; molecular weight=641.15. Calculated: C, 63.7%; H, 6.4%; N, 4.4%. Found: C, 64.1%; H, 6.4%; N, 4.5%.

This compound is not described in the literature.

It is readily apparent that Steps 6 through 10 would result in the production of the 6a-ethyl isomer or the 6-ethyl racemate depending on the starting compound.

The preceding example was given purely for descriptive purposes and is not to be limitative of the invention. Such changes and modifications as would occur to one skilled in the art may be made without departing from the spirit of the invention. Particularly, one could vary the conditions, modify the nature of the solvent, acids or bases employed, effect the separation of the stereoisomers in another stage of the synthesis or even effect the final trimethoxybenzoylation according to the process described in United States Patent No. 2,926,167. The invention is to be construed by the appended claims.

We claim:

1. 18β-acetoxy-6-ethyl-10-chloro - 17α - methoxy-16β-carbomethoxy-2-3,3-4 - diseco-Δ$^{4(21)}$-20α - yohimbene - 3-oic acid.

2. 18β-acetoxy-6-ethyl-10-chloro - 17α - methoxy-16β-carbomethoxy-2-3,3-4-diseco-20α-yohimbane-3-oic acid.

3. 18β-acetoxy-6-ethyl-10-chloro - 17α - methoxy-16β-carbomethoxy-Δ$^{3(14)}$-20α-yohimbene having the formula:

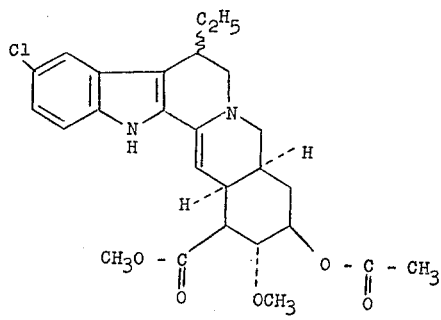

selected from the group consisting of the 6a-stereoisomer, the 6b-stereoisomer, and mixtures thereof.

4. 18β-hydroxy-6-ethyl-10-chloro - 17α - methoxy-16β-carbomethoxy-3β,20α-yohimbane having the formula:

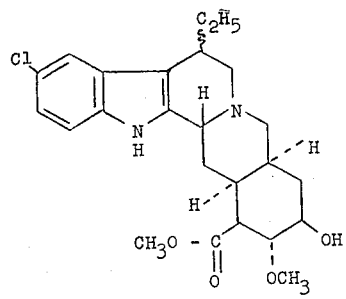

selected from the group consisting of the 6a-stereoisomer, the 6b-stereoisomer, and mixtures thereof.

5. The process of producing 6-ethyl-10-chloro-deserpidines having the formula:

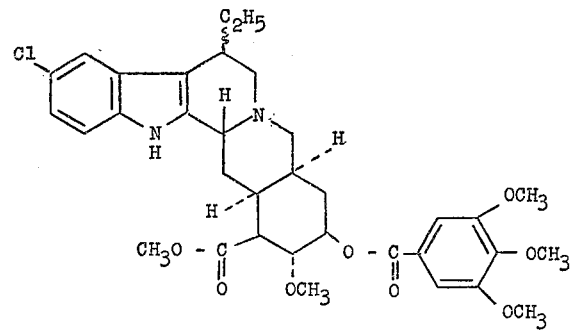

selected from the group consisting of the 6a-stereoisomer, the 6b-stereoisomer, and mixtures thereof, which comprises the steps of reacting the acid salt of 2-(5'-chloro-3'-indolyl)-1-butylamine with dextro-rotatory (pyridine) 1β-carboxymethyl-2β-carbomethoxy-3α-methoxy-4β - acetoxy-6β-formyl-cyclohexane in the presence of a tertiary organic base, reducing the 18β-acetoxy-6-ethyl-10-chloro-17α-methoxy-16β-carbomethoxy-2-3,3-4 - diseco - Δ$^{4(21)}$-20α-yohimbene-3-oic acid with an alkali metal borohydride, closing the D ring of the 18β-acetoxy-6-ethyl-10-chloro-17α-methoxy-16β-carbomethoxy - 2-3,3-4 - diseco-20α-yohimbane-3-oic acid by heating at an elevated temperature, closing the C ring of the 18β-acetoxy-6-ethyl-10-chloro-17α-methoxy-16β - carbomethoxy - 3-oxo-2-3-seco-20α-yohimbane by refluxing with phosphorus oxychloride, reducing the 18β-acetoxy-6-ethyl-10-chloro-17α-methoxy-16β-carbomethoxy-Δ$^{3(14)}$-20α-yohimbene by the action of zinc, separating the crystals of 18β-acetoxy-6-ethyl-10-chloro-17α-methoxy-16β-carbomethoxy - 3β,20α-yohimbane, saponifying said 3β-isomer with a saponifying agent, recovering said 18β-hydroxy-6-ethyl-10-chloro-17α-methoxy-16β-carbomethoxy-3β,20α - yohimbane, reacting said 18β-hydroxy-yohimbane with an esterifying derivative of 3,4,5-trimethoxy-benzoic acid in the presence of a tertiary organic base and recovering said 6-ethyl-10-chloro-deserpidine.

6. The process of claim 5 wherein said 18β-acetoxy-6-ethyl-10-chloro-17α-methoxy-16β-carbomethoxy-3 - oxo-2-3-seco-20α-yohimbane is saponified to give the corresponding 18β-hydroxy compound, the 18β-hydroxy-6-ethyl-10-chloro-17α-methoxy-16β-carbomethoxy-3 - oxo-2-3-seco-20α-yohimbane is separated into its two 6-ethyl stereoisomers and said 6-ethyl stereoisomers are individually acetylated and processed.

7. The process of producing levo-rotatory 6b-ethyl-10-chloro-deserpidine having a melting point of 263° C. to 265° C. and a specific rotation $[\alpha]_D^{20} = -80.5°$ (c.=0.5% in chloroform) which comprises the step of subjecting 2-(5'-chloro-3'-indolyl)-1-nitro-ethene to the action of ethyl magnesium iodide in the presence of anhydrous tetrahydrofuran, reducing the 2-(5'-chloro-3'-indolyl)-1-nitro-butane by the action of lithium-aluminum hydride in the presence of tetrahydrofuran, acidifying and isolating 2-(5'-chloro-3'-indolyl)-1-butylamine in the form of its acid salt, reacting said acid salt with dextro-rotary (pyridine) 1β-carboxymethyl-2β-carbomethoxy-3α-methoxy-4β-acetoxy-6β-formyl-cyclohexane in the presence of a tertiary organic base, reducing the 18β-acetoxy-6-ethyl-10 - chloro - 17α-methoxy - 16β-carbomethoxy - 2 - 3,3-4-diseco-Δ$^{4(21)}$-20α-yohimbene-3-oic acid with an alkali metal borohydride, closing the D ring of the 18β-acetoxy-6-ethyl-10-chloro-17α-methoxy-16β-carbomethoxy - 2-3,3-4-diseco-20α-yohimbane-3-oic acid by heating at an elevated temperature, saponifying the 18β-acetoxy-6-ethyl-10-chloro-17α-methoxy-16β-carbomethoxy - 3 - oxo-2-3-seco-20α-yohimbane with an alkali metal borohydride in an inert organic solvent, dissolving the 18β-hydroxy-6- ethyl-10-chloro-17α-methoxy-16β-carbomethoxy-3-oxo-2-3-seco-20α-yohimbane in an inert organic solvent, cooling, separating the 6a-ethyl isomer from the 6b-ethyl isomer, acetylating the 18β-hydroxy-6b-ethyl-10-chloro-17α-methoxy-16β-carbomethoxy-3-oxo-2-3-seco-20α-yohimbane, heating the 18β-acetoxy-6b-ethyl-10-chloro-17α-methoxy-16β-carbomethoxy-3-oxo-2-3-seco-20α-yohimbane with phosphorus oxychloride, alkalizing with ammonia, reducing the 18β-acetoxy-6b-ethyl-10-chloro-17α-methoxy-16β-carbomethoxy-$\Delta^{3(14)}$-20α-yohimbene with zinc in a perchloric acid solution, saponifying the 18β-acetoxy-6b-ethyl-10-chloro-17α-methoxy-16β-carbomethoxy-3β,20α-yohimbane by the action of an alkali metal borohydride, esterifying the 18β-hydroxy-6b-ethyl-10-chloro-17α-methoxy-16β-carbomethoxy-3β,20α-yohimbane with 3,4,5-trimethoxy-benzoyl chloride in the presence of a tertiary organic base and recovering said levo-rotatory (chloroform) 6b-ethyl-10-chloro-deserpidine.

References Cited in the file of this patent

UNITED STATES PATENTS

| | | |
|---|---|---|
| 2,703,325 | Speeter | Mar. 1, 1955 |
| 2,708,197 | Speeter | May 10, 1955 |
| 2,857,385 | Kuehne | Oct. 21, 1958 |
| 2,883,384 | Woodward | Apr. 21, 1959 |
| 2,920,080 | Bucourt et al. | Jan. 5, 1960 |
| 2,926,167 | Joly et al. | Feb. 23, 1960 |
| 2,929,817 | Joly et al. | Mar. 22, 1960 |

OTHER REFERENCES

Karrer: Organic Chemistry, 2nd Eng. Ed., Elsevier, New York (1946), page 24.

Richter's Organic Chemistry, volume IV (1947), page 222.

Woodward: Jour. Amer. Chem. Soc., volume 78 (1956), pages 2023–25.

Vane: British Jour. of Pharmacology, volume 14 (1959), pages 87–91.